April 28, 1931.  O. E. SEGRIN  1,802,842
ICING MACHINE FOR CAKES
Filed March 19, 1929  4 Sheets-Sheet 1
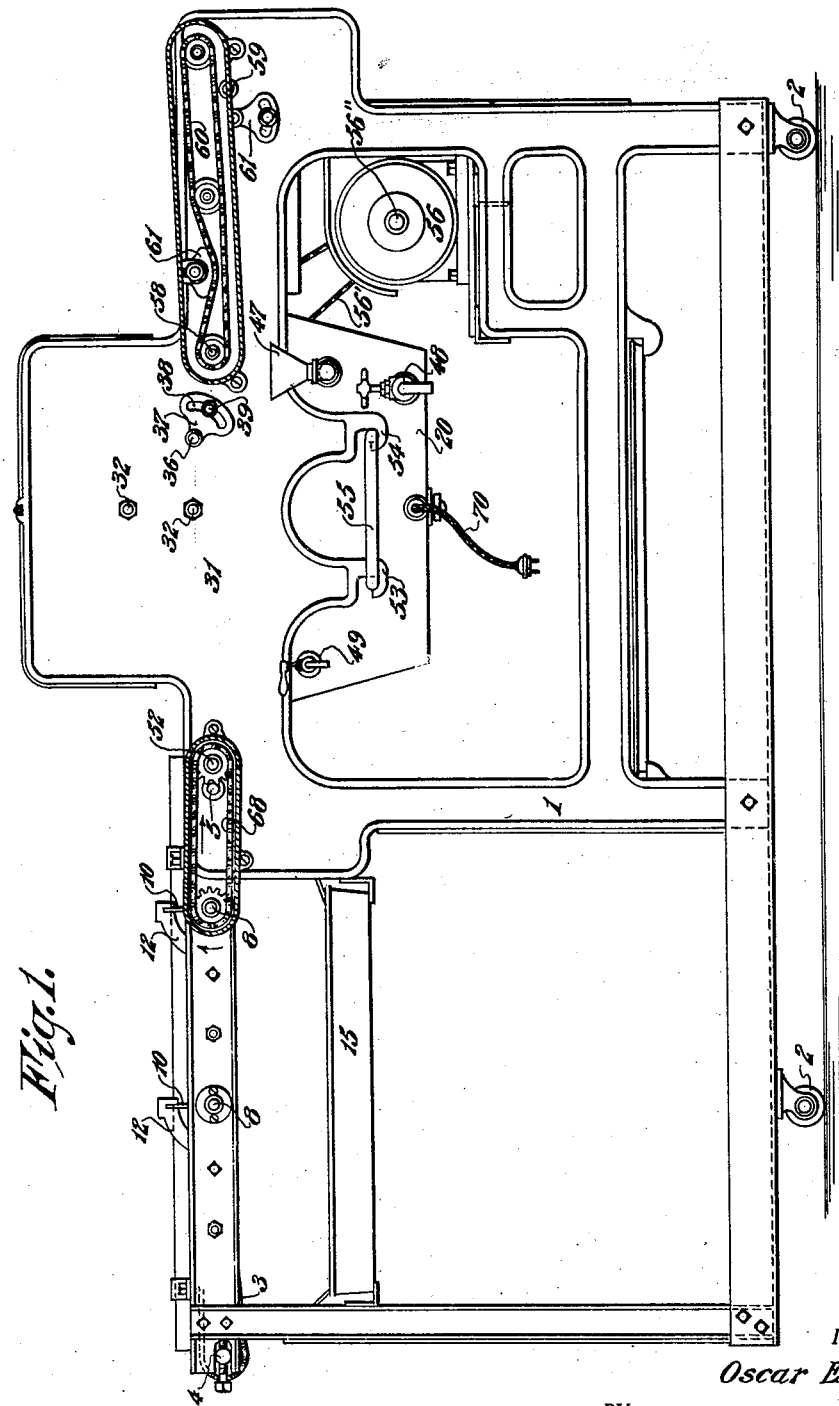
INVENTOR,
Oscar E. Segrin
BY
Harry W. Bowen.
ATTORNEY.

April 28, 1931. O. E. SEGRIN 1,802,842
ICING MACHINE FOR CAKES
Filed March 19, 1929 4 Sheets-Sheet 2
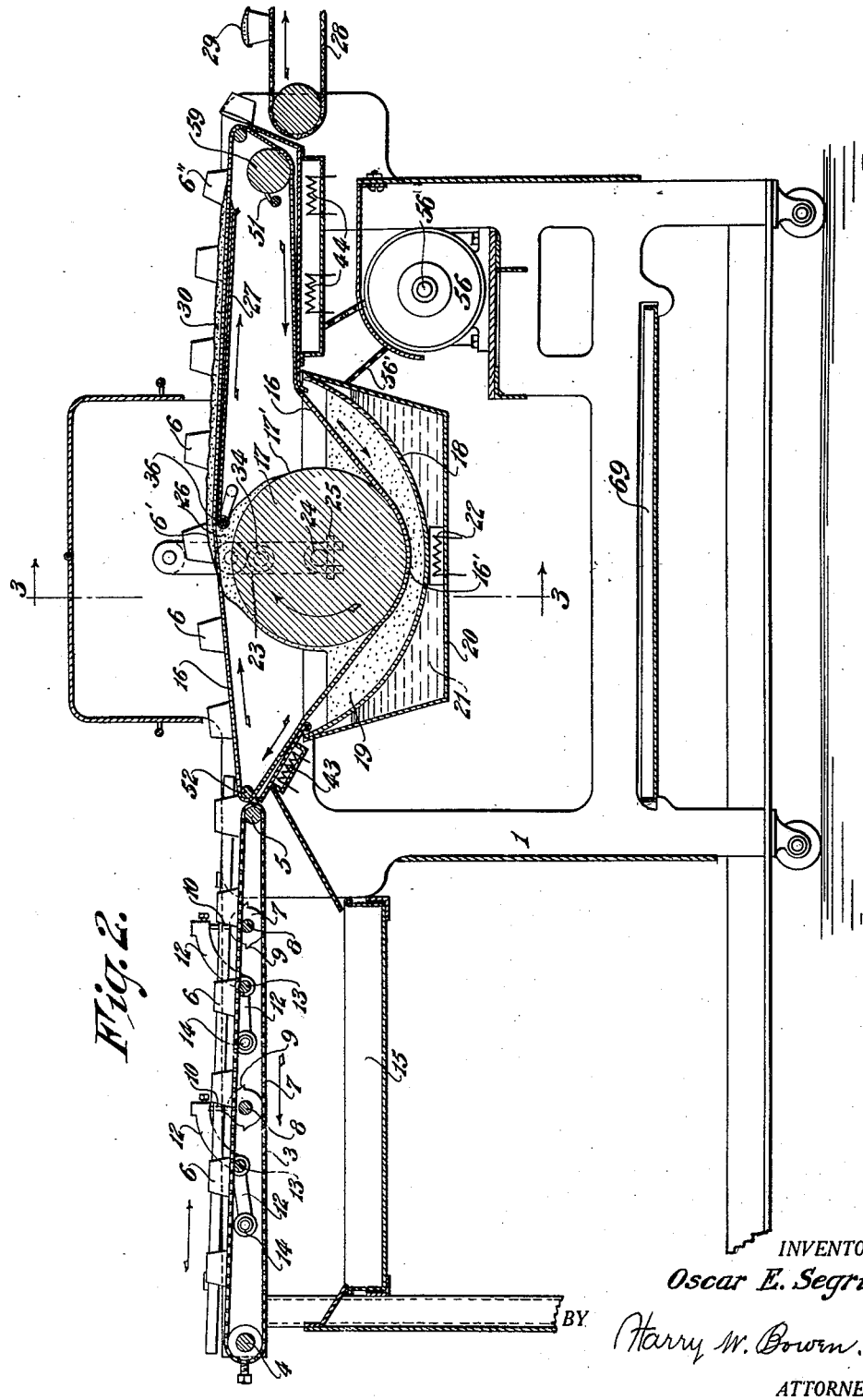
INVENTOR,
Oscar E. Segrin,
BY Harry W. Bowen.
ATTORNEY.

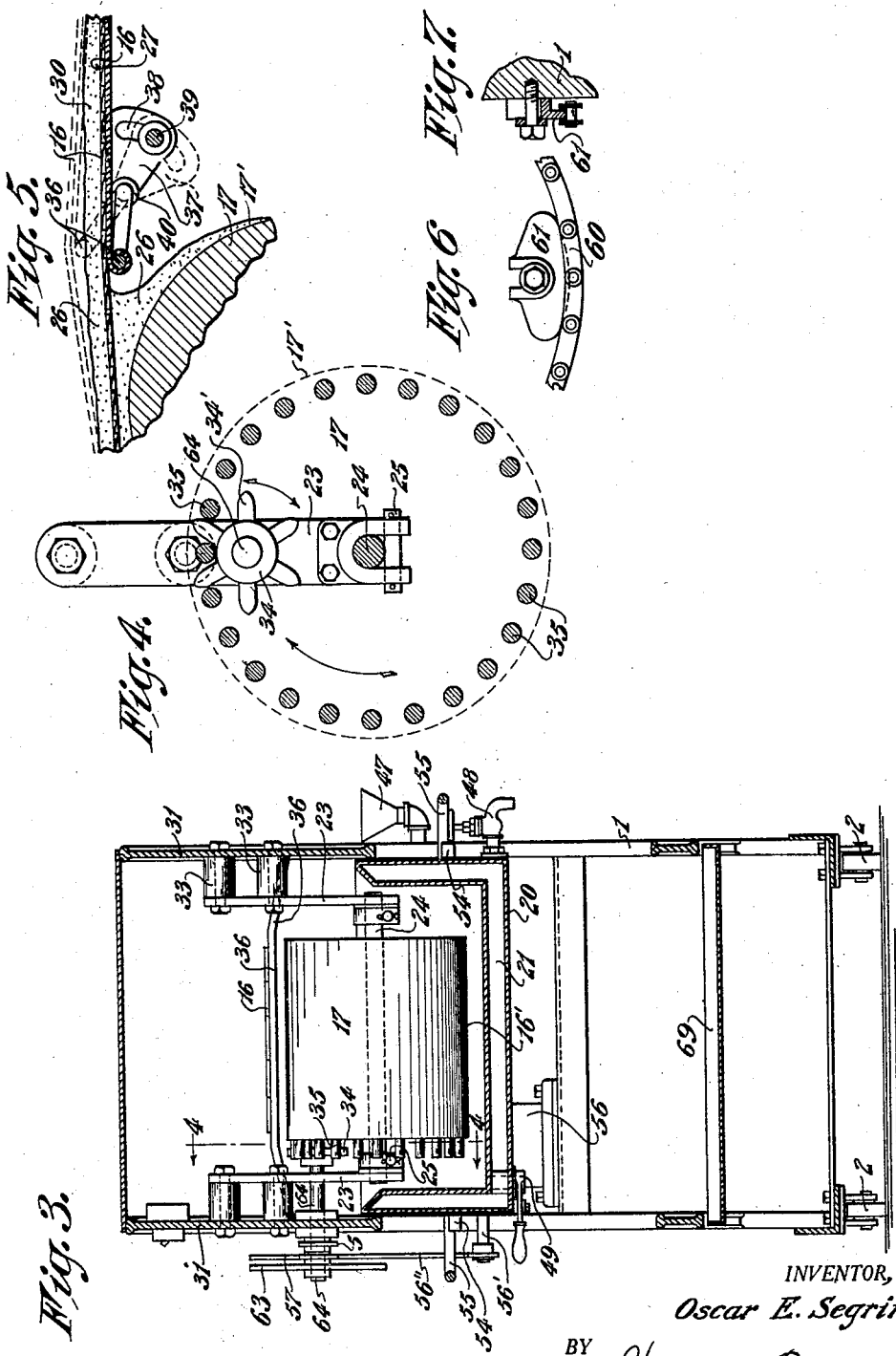

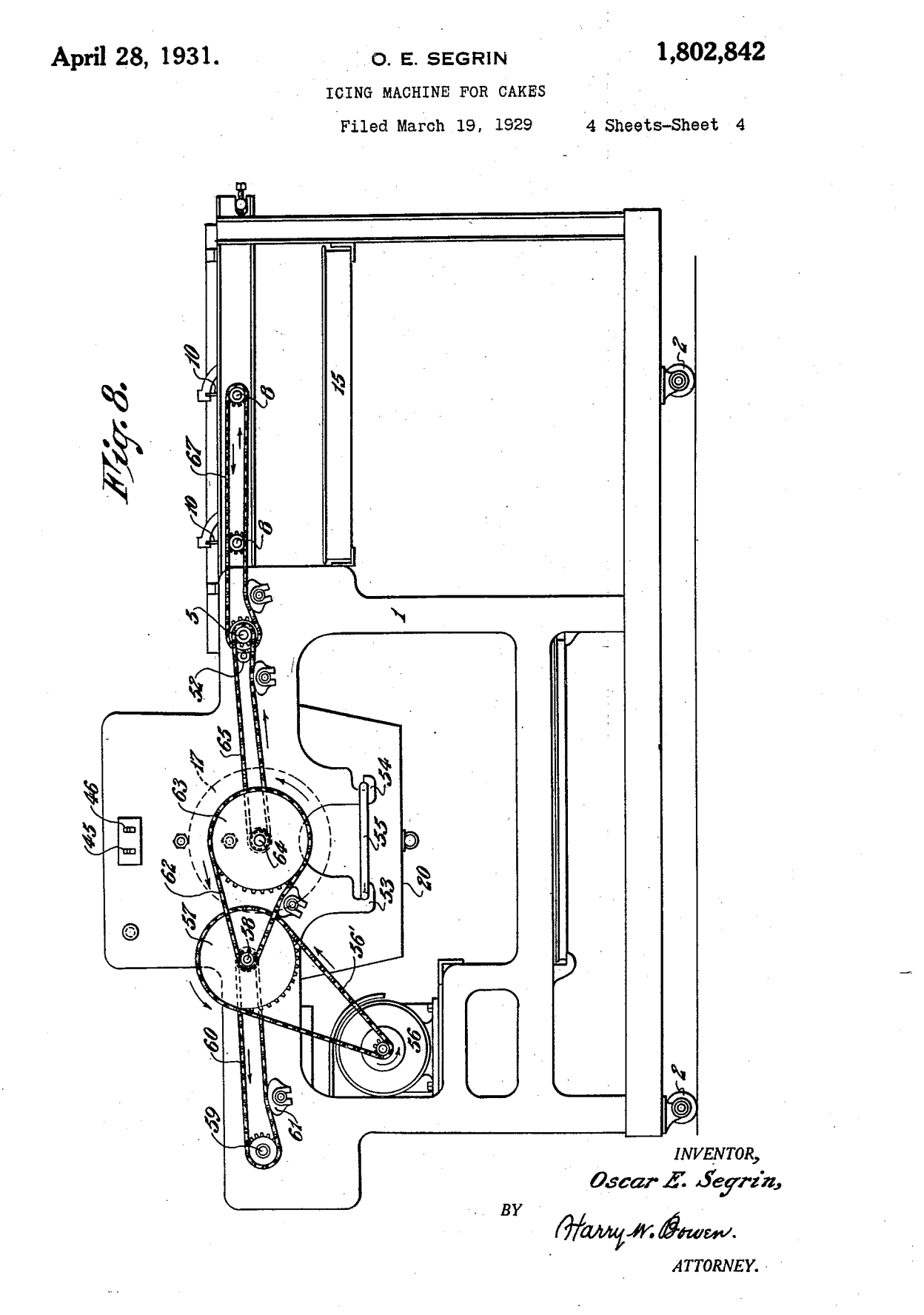

April 28, 1931. O. E. SEGRIN 1,802,842
ICING MACHINE FOR CAKES
Filed March 19, 1929 4 Sheets-Sheet 4

INVENTOR,
Oscar E. Segrin,
BY
Harry N. Bowen.
ATTORNEY.

Patented Apr. 28, 1931

1,802,842

UNITED STATES PATENT OFFICE

OSCAR E. SEGRIN, OF SPRINGFIELD, MASSACHUSETTS, ASSIGNOR, BY MESNE ASSIGN-MENTS, TO MERROW BROTHERS, INC., OF BOSTON, MASSACHUSETTS

ICING MACHINE FOR CAKES

Application filed March 19, 1929. Serial No. 348,219.

This invention relates to improvements in icing machines for icing cakes.

An object of the invention is to provide a machine that will subject the cakes to be iced to a shaking or vertical vibrating motion for the purpose of removing any loose crumbs before the icing or coating material is applied.

A further object is to apply the icing to the bottoms of the cakes by means of a roller which rotates in a supply of the coating material, at a speed, or rate of motion that is greater than the travelling wire belt conveyor on which the cakes are placed. The centrifugal action of the roller, in the supply tank operates by centrifugal force to throw the icing material upward on to the bottoms of the cakes.

A further object is to automatically invert the coated cakes as they leave the travelling wire belt conveyor and are received on the cooling belt, whereby the coated bottoms will be on the upper ends of the cakes.

A further object is to provide means for electrically heating the water bath, which surrounds the tank of icing material to properly maintain its desired temperature, which in practice, is about 87° F.

A further object is to provide means for varying the distance between the bottoms of the cakes to be coated and the rotating cylinder, which throws the icing material on to the bottoms of the cakes, whereby the thickness may be changed, as desired.

A further object is to provide means for readily removing the pan which contains the supply of coating or icing material.

A further object is to prevent marks or impressions of the wire conveyors appearing on the coatings.

Further objects and nature of the invention will appear in the body of the specification with reference to the drawings and appended claims.

Referring to the drawings:

Fig. 1 is a side elevational view of the assembled machine.

Fig. 2 is a vertical and longitudinal sectional view considered in a plane substantially midway of the width of the machine and showing the supply or icing cylinder and the three cake supporting conveyors in section.

Fig. 3 is a transverse sectional view substantially on the line 3—3 of Fig. 2, showing the coating or icing cylinder and its driving mechanism.

Fig. 4 is an end view of Fig. 3 on the line 4—4 illustrating the driving means for the coating cylinder and its bearing support.

Fig. 5 illustrates the means for adjusting the vertical position of the wire belt relative to the upper rotating surface of the icing supply cylinder.

Figs. 6 and 7 are detail views of the shoe which engage the roller pins of the belt on which the cakes are carried, and Fig. 8 is a side elevational view, showing the operative driving connections.

Referring to the drawings in detail:

1 designates the main supporting frame, which is provided with rollers, or casters 2. At the left hand, or entrance end of the machine, there is located the cake receiving wire belt conveyor 3 formed of parallel rods, which conveyor is supported on the shafts 4 and 5, the shaft 5 being the driving shaft. 6 designates several pieces of cake, or other articles, on the conveyor 3, that are to be iced or coated. For the purpose of removing, or shaking off any loose crumbs from the pieces of cake, I provide means for vertically vibrating, or agitating, the conveyor, which means comprises wheels 7 on the driven shafts 8. These wheels are formed with spurs or inclined projections 9 with which the hardened pieces 10 on the end of the angular-shaped levers 12 engage. These levers rock on the shafts 13 and carry rollers 14 at their inner ends, which move upward against the underside of the wire conveyor 3 for automatically imparting a vertically agitating motion to this conveyor for shaking off any loose particles, or crumbs, on the cakes 6, before they are subjected to the icing process. A pan 15 is located below the conveyor 3 for catching the crumbs, as they fall.

Adjacent the drive shaft 5 and the delivery end of the receiving conveyor 3 is an endless open wire belt conveyor 16 on to which the cakes 6 are delivered for the icing process.

Located below the upper strand of this wire belt conveyor is a coating cylinder 17 having a smooth outer surface 17'. This cylinder rotates in the tank 18, in which the supply of icing material, as chocolate, 19, is placed. This tank, 18, is placed within an outer tank 20, in which the water, indicated at 21, is placed for maintaining a uniform degree of temperature for the icing material. An electric heating element 22 is provided. The cylinder's lower surface engages the wire belt conveyor 16. This cylinder is supported in the depending hangers 23 by means of the shaft 24 and pins 25. This construction thoroughly prevents the chocolate, or icing, from interfering with the free movement of the shaft. This cylinder is rotated at a speed sufficiently fast in order to throw, or project, the icing material upward through the meshes of the wire belt conveyor 16, and forcibly against the bottom surfaces 6' of the cakes 6, as indicated at 26. This icing material is now carried along with the wire belt conveyor and moves on the plate 27, whereby the cakes are floated on the icing material, until they reach the position 6'', where they are ready to leave the wire conveyor 16 and fall on to the cooling conveyor 28, in a reversed or inverted position with the icing material now located on their upper ends, as shown clearly at 29. The purpose of floating the cakes on icing material, indicated at 30, is to prevent the possibility of any wire marks of the conveyor 16 appearing in the icing of the cakes, which, as stated, forms the upper surface of the cakes. Such marks would, of course, be very objectionable in appearance in the finished product.

The surface speed of the cylinder 17 is greater than that of the wire conveyor or belt 16. This is possible, since the surface of the cylinder is smooth and the portion 16' of the conveyor would slip relative to the cylinder. The shaft hangers 23 are secured to the inside of the casing plates 31, with the bolts 32 and spacing sleeves 33.

The smooth cylinder 17 is driven by means of the spoked wheel 34, the spokes 34' of which engage the laterally projecting pins 35 on the left hand end of the cylinder, as shown. This construction prevents, or overcomes, the possibility of the chocolate icing becoming clogged or freezing and thus rendering the machine inoperative.

For the purpose of elevating the wire conveyor 16 above the cylinder 17 for changing the distance between the same, and the cylinder 17, I employ a crank-shaped wire 36, which extends across the machine under the conveyor and to which wire is fixedly secured the plate 37 that is formed with a curved slot 38, which receives the securing bolt 39. The wire 36 has a bearing at 40, in the frame 1. When the plate 37 is secured in different positions of adjustment with the nut 39, the cross wire 36 may be raised and lowered to vary the vertical position of the wire conveyor 16, relative to the upper surface of the cylinder 17. This adjustment permits more or less of icing material to be applied to the bottoms of the cakes, as readily understood.

Electric heating elements 43 and 44 are provided for maintaining a uniform temperature of the icing on the conveyor, the electric switches for these elements being shown at 45, and 46, in Fig. 8.

47 is the filling spout or tunnel for the water pan 20. 48 is the draw-off valve for the water pan 20, and, 49 is the draw-off valve for the icing tank 18. 59 is a driving roller or shaft for the wire conveyor chain 16 and having the scraper 51. 52 is a second drive shaft for the wire conveyor 16.

An important feature of my improvement is in the manner of attaching the water pan 20 within which is located icing pan 18, which consists of the two hooks 53 and 54 on the lower ends of the frame plates, which receive the handle bar 55 which is secured to the water pan.

The electric motor is indicated at 56, and its shaft at 56', which is connected by the belt 56'' to the pulley 57 on the shaft 58, see Fig. 8. Driven from this shaft is the shaft 59, which operates the conveyor 16. 61 are adjustable shoes, see Figs. 6 and 7, which ride on the rollers of the links of the different chains. These shoes are used to vary the tension of the different chains. 62 is a belt from the shaft 58 for driving the pulley 63 on the shaft 64, that drives the link belt conveyor 3 with the belt 65 to the cross shaft 5. Driven from the shaft 5 with the belt 67 are the shafts 8 on which the wheels 7 that carry the projections 9 for agitating the link conveyor 3, as described, are located, for removing the crumbs from the cakes 6.

The shafts 52 and 59 are connected with the wire belt conveyor 16 and are driven by these shafts.

The cross shaft 5 drives the shaft 52 by means of the chain 68 which is located on the opposite side of the machine. This chain connects the middle shaft 8 to a sprocket wheel on the opposite end of the shaft 52, as shown in Fig. 1. 69 is a pan for catching any droppings from the conveyor 16, when the tank 20 is removed and 70 is the electric cord for supplying electric current to the heating element 22.

What I claim is:

1. An icing machine having in combination with an article receiving conveyor, a second receiving conveyor having an open mesh, a rotatable cylinder in the icing material and means for vertically spacing the second conveyor from and above the cylinder for determining the thickness of the icing which is applied to the bottoms of the articles, when the rate of rotation of the cylinder is sufficiently great to project the icing material by centrifugal force through the open mesh of the conveyor and against the bottoms of the articles.

2. In combination, conveying means to receive cake articles to be coated, means for vibrating the conveyor for shaking any loose crumbs from the articles, comprising bell crank members having an arm below the conveyor, rotatable members formed with projections which engage the other arms of the bell crank members for intermittently moving the first mentioned arms against the conveyor, a second conveyor onto which the articles are delivered, a smooth cylinder rotating in the coating material for delivering the coating material by centrifugal force onto the bottoms of the articles, and means for floating the articles on the coating material after the bottom coating is applied for preventing the conveyor from leaving marks on the bottoms of the articles, as described.

OSCAR E. SEGRIN.